(12) United States Patent
Hirai

(10) Patent No.: US 8,154,384 B2
(45) Date of Patent: Apr. 10, 2012

(54) PERSONAL AUTHENTICATION APPARATUS AND PERSONAL AUTHENTICATION METHOD

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 12/470,003

(22) Filed: May 21, 2009

(65) Prior Publication Data

US 2009/0309702 A1      Dec. 17, 2009

(30) Foreign Application Priority Data

Jun. 16, 2008   (JP) .................. 2008-156996
Apr. 23, 2009   (JP) .................. 2009-105611

(51) Int. Cl.
*G06K 9/00*   (2006.01)
*G06F 7/04*   (2006.01)
*G06T 1/00*   (2006.01)
*G06T 7/00*   (2006.01)

(52) U.S. Cl. ...................................... 340/5.83; 382/118
(58) Field of Classification Search .................. 340/5.83, 340/5.53; 382/118
See application file for complete search history.

(56) References Cited

U.S. PATENT DOCUMENTS

| | | | |
|---|---|---|---|
| 7,062,073 B1 * | 6/2006 | Tumey et al. ................. | 382/118 |
| 2006/0115157 A1 * | 6/2006 | Mori et al. .................... | 382/190 |
| 2006/0233426 A1 * | 10/2006 | Mariani ........................ | 382/118 |
| 2006/0261931 A1 * | 11/2006 | Cheng ......................... | 340/426.1 |
| 2007/0127785 A1 * | 6/2007 | Hiraizumi et al. ............ | 382/118 |
| 2008/0273765 A1 * | 11/2008 | Tsujimura ..................... | 382/118 |
| 2010/0164684 A1 * | 7/2010 | Sasa et al. .................... | 340/5.83 |

FOREIGN PATENT DOCUMENTS

| JP | 06-119433 | 4/1994 |
|---|---|---|
| JP | 2005-266981 | 9/2005 |

* cited by examiner

*Primary Examiner* — Jennifer Mehmood
*Assistant Examiner* — Andrew Bee
(74) *Attorney, Agent, or Firm* — Cowan, Liebowitz & Latman, P.C.

(57) ABSTRACT

A personal authentication apparatus comprises an input unit configured to input image data; a face detection unit configured to detect a face region of a person included in the image data input by the input unit, and to detect feature data from the detected face region; a facial expression determination unit configured to determine a facial expression from the face region detected by the face detection unit; a storage unit configured to store feature data used to authenticate a person in correspondence with respective facial expressions of a plurality of faces; a selection unit configured to select feature data corresponding to the facial expression determined by the facial expression determination unit from the storage unit; and an authentication unit configured to authenticate a person by comparing the feature data of the face region detected by the face detection unit, and the feature data selected by the selection unit.

6 Claims, 7 Drawing Sheets

FIG. 2

|  | BLANKNESS | SMILE | EYE CLOSURE |
|---|---|---|---|
| MR. A | DATA A-1 | DATA A-2 | DATA A-3 |
| MR. B | DATA B-1 | DATA B-2 | DATA B-3 |
| MR. C | DATA C-1 | DATA C-2 | DATA C-3 |

F I G. 6
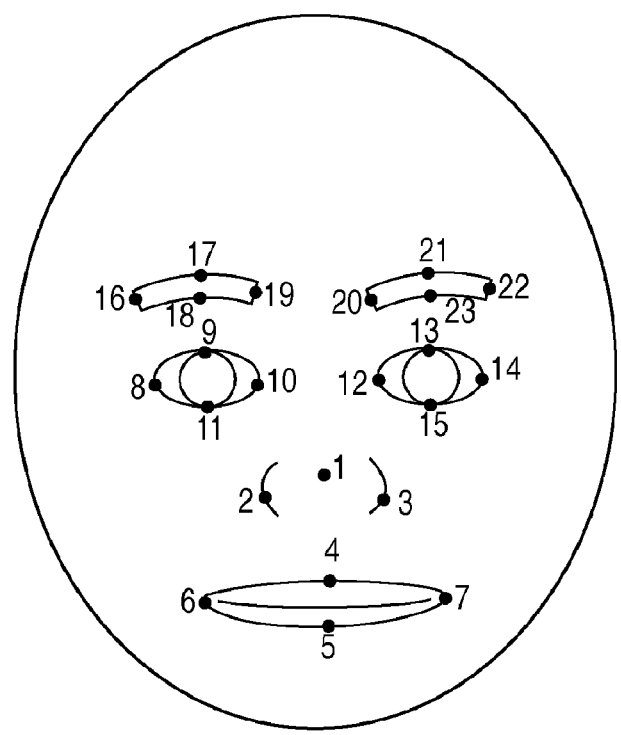
F I G. 7
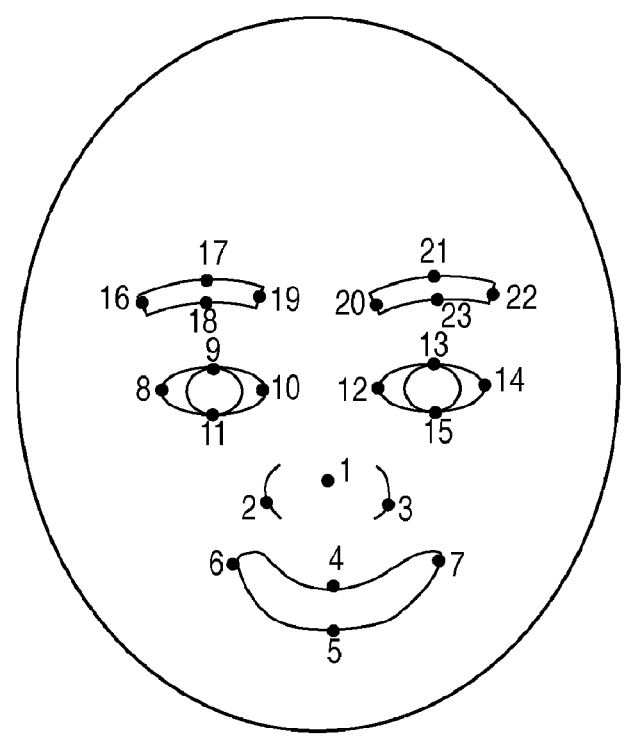

PERSONAL AUTHENTICATION APPARATUS AND PERSONAL AUTHENTICATION METHOD

BACKGROUND OF THE INVENTION

1. Field of the Invention

The present invention relates to a technique for detecting a face region of a person from image data, and executing personal authentication.

2. Description of the Related Art

Conventionally, a technique for executing personal authentication using a face detection function is known. This technique extracts feature data of a face region different for each person from detected face image data, and compares the feature data with those which are registered in advance, thereby identifying whether or not the detected face is that of a registered person.

However, since the feature data are influenced by the facial expression of the face region, the difference between the facial expression of the face region and that upon registration deteriorates the precision of personal authentication.

In order to avoid this, a method of detecting the facial expression of a face region, determining whether or not the detected facial expression is valid to execute personal authentication, and executing the personal authentication using new image data when it is determined that the facial expression is invalid is known (for example, see Japanese Patent Laid-Open No. 06-119433).

However, with the method described in Japanese Patent Laid-Open No. 06-119433, since the personal authentication cannot be started until a valid facial expression is obtained, it takes much time until authentication. Also, when a valid facial expression does not appear, the authentication is disabled.

SUMMARY OF THE INVENTION

The present invention has been made in consideration of the aforementioned problems, and implements a personal authentication technique which can quickly execute personal authentication with higher precision even when a facial expression changes.

In order to solve the aforementioned problems, the present invention provides a personal authentication apparatus comprising: an input unit configured to input image data; a face detection unit configured to detect a face region of a person included in the image data input by the input unit, and to detect feature data from the detected face region; a facial expression determination unit configured to determine a facial expression from the face region detected by the face detection unit; a storage unit configured to store feature data used to authenticate a person in correspondence with respective facial expressions of a plurality of faces; a selection unit configured to select feature data corresponding to the facial expression determined by the facial expression determination unit from the storage unit; and an authentication unit configured to authenticate a person by comparing the feature data of the face region detected by the face detection unit, and the feature data selected by the selection unit.

The present invention also provides a personal authentication method to be executed by a personal authentication apparatus which includes: an input unit configured to input image data; a face detection unit configured to detect a face region of a person included in the image data input by the input unit, and to detect feature data from the detected face region; a facial expression determination unit configured to determine a facial expression from the face region detected by the face detection unit; and a storage unit configured to store feature data used to authenticate a person in correspondence with respective facial expressions of a plurality of faces, the method comprises: a selection step of selecting feature data corresponding to the facial expression determined by the facial expression determination unit from the storage unit; and an authentication step of authenticating a person by comparing the feature data of the face region detected by the face detection unit, and the feature data selected in the selection step.

According to the present invention, even when a facial expression changes, since personal authentication is executed by selecting appropriate feature data according to the facial expression, the authentication precision can be improved.

Further features of the present invention will become apparent from the following description of exemplary embodiments with reference to the attached drawings.

BRIEF DESCRIPTION OF THE DRAWINGS

FIG. 2 is a view showing an example of a personal database according to the first embodiment;

FIG. 6 is a view showing an example of features; and

FIG. 7 is a view showing an example of features in case of a "smile" face.

DESCRIPTION OF THE EMBODIMENTS

Embodiments of the present invention will be described in detail hereinafter with reference to the accompanying drawings.

Note that the embodiments to be described hereinafter are merely examples upon implementation of the present invention and should be appropriately modified or changed depending on the arrangements of apparatuses and various conditions to which the present invention is applied, and the present invention is not limited to the following embodiments.

First Embodiment

Figure 1:
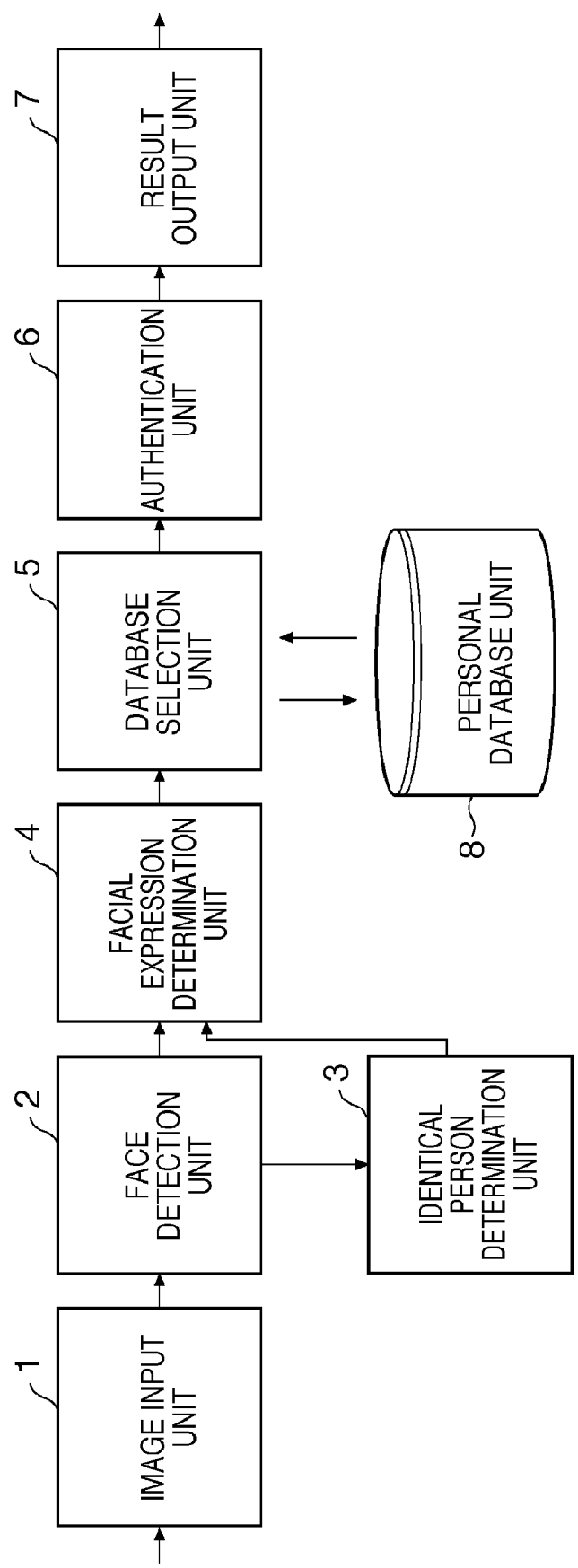
FIG. 1 is a block diagram showing the arrangement of a personal authentication apparatus according to the first embodiment of the present invention.

FIG. 1 is a schematic block diagram showing the arrangement of a personal authentication apparatus according to an embodiment of the present invention.

A personal authentication apparatus of this embodiment inputs image data from an image input unit 1, and a face detection unit 2 detects the position and size of a face region of a person from this image data. As for face detection, a given method can be used. For example, the face detection unit 2 extracts shapes corresponding to components of a face region such as a nose, mouth, and eyes from the input image data, and detects a region where the nose and mouth exist on an extended line that passes through the center between the two eyes. The face detection unit 2 estimates the size of the face based on the sizes of the two eyes and their distance, and specifies, as a face region, a region bounded by a region having the estimated size with reference to a position corresponding to the center of the nose.

The face detection unit 2 extracts feature data from the detected face region. As disclosed in, for example, Japanese Patent Laid-Open No. 2005-266981, the feature data include information associated with practical shapes of components of a face such as a mouth, eyes, eyebrows, and nose, and the positions of these components. Note that the feature data can be extracted by calculations from image data of the input face region using, e.g., a neural network or an edge detection method that uses a spatial filter. Of course, not only information associated with the shapes and positions but also information associated with saturations and hues may be included in the feature data. The appearance of the face can be analyzed in more detail with increasing number of feature data per face, and the precision of the facial expression determination and personal authentication using the feature data can be improved.

In image data including a plurality of frames like a movie, faces are detected for respective frames at given periods. An identical person determination unit 3 determines which faces that appear in these frames correspond to an identical person. For example, when a plurality of faces are detected from image data of a certain frame, and one or a plurality of faces are detected from image data of another frame, the identical person determination unit 3 determines that faces having similar sizes and positions correspond to an identical person.

A facial expression determination unit 4 determines a facial expression of a face based on the feature data extracted by the face detection unit 2. The types of facial expressions to be determined include "blankness", "smile", and "eye closure". A database selection unit 5 selects and reads out, based on the determination result of the facial expression determination unit 4, feature data corresponding to that facial expression from feature data for personal authentication, which are registered in advance in a personal database unit 8. An authentication unit 6 executes personal authentication by comparing and collating the feature data selected by the database selection unit 5 with those of the face region extracted by the face detection unit 2, and a result output unit 7 outputs the authentication result.

This personal authentication apparatus may be configured as a standalone apparatus or a system including a plurality of apparatuses. For example, a standalone digital camera or digital video camera may include all components from the image input unit 1 to the personal database unit 8. Alternatively, a digital camera or digital video camera may include only the image input unit 1, and an external computer that can communicate with the digital camera or digital video camera may include other components. Furthermore, a plurality of computers on a network may share and include all components from the image input unit 1 to the personal database unit 8, and the computer including the image input unit 1 may receive image data from another external apparatus or recording media.

In this embodiment, as feature data for personal authentication, the coordinates of 23 features are used, as shown in FIG. 6. In order to execute personal authentication in practice, more features are required. However, the following description will be made under the assumption that 23 features are used, for the sake of simplicity.

When a face in image data has a tilt, these 23 features are calculated after the image data is rotated to remove this tilt. The coordinates of these features are calculated based on the positions of the eyes, nose, mouth, eyebrows, and the like extracted from the image data by the face detection unit 2 by normalizing the size of the face by, e.g., the distance between the two eyes. This coordinate position is determined with reference to the position of the end point of the nose. The authentication unit 6 defines the coordinates of the features calculated from the input image data by $Pi$ ($i=1, 2, \ldots, 23$), and calculates an absolute value sum $S=\Sigma|Pi-P'i|$ of differences from coordinates $P'i$ of features of a person registered in advance in the personal database unit 8. As this absolute value sum S is smaller, a person to be detected and a person registered in advance have a high possibility of an identical person. When the absolute value sum S of a person determined to have the highest possibility is equal to or smaller than a pre-set threshold, the authentication unit 6 determines that the person to be detected is a registered person; otherwise, the authentication unit 6 determines that there is no corresponding person.

Note that this method of calculating the absolute value sum S is one example of personal authentication methods, and personal authentication may be executed using other methods. For example, a person may be identified from change patterns of the positions and shapes of the eyes and mouth upon changing from a "blankness" face to a "smile" face, or a large number of image data having different resolutions may be generated from image data of a face, resolution-dependent personal authentication processes may be executed, and a final personal authentication result may be obtained from the integrated result of these processes. That is, even when other methods are used, the same effects as in this embodiment can be obtained as long as an arrangement in which a person with a highest possibility is determined by collating with data registered in advance in the personal database unit 8 is adopted.

Facial expression determination by the facial expression determination unit 4 can be implemented by detecting temporal changes of relative positions of the features on an identical face. For example, in case of a "smile" face, the positions of the features are changed like that the eyes are narrowed, and the corners of the mouth are lifted up, as shown in FIG. 7, compared to a "blankness" face shown in FIG. 6. In this embodiment, when the distance between features 9 and 11 of upper and lower central points of the observers' left eye, and the distance between features 13 and 15 of upper and lower central points of the observers' right eye are decreased at a predetermined ratio or more with respect to those on the "blankness" face, and the positions of features 6 and 7 of the left and right ends of the mouse with respect to features 4 and 5 of upper and lower central ends of the mouse are lifted up at a predetermined ratio or more compared to the "blankness" face, "smile" is determined. Furthermore, when the positions of the features 4 to 7 of the mouth do not satisfy the "smile" condition, and the distance between the features 9 and 11 and that between the features 13 and 15 of the eyes are decreased compared to those on the "blankness" face, "eye closure" is determined.

As for determination of a face region of a "blankness" face, for example, when the change amount of the shape of the mouse does not exceed a predetermined threshold for a predetermined period of time, a face region obtained at that time can be determined as a "blankness" state. Alternatively, values obtained by averaging the features of several successive frames for an identical face region may be used to define a "blankness" state. Alternatively, by comparing the features obtained over a plurality of successive frames for an identical face region, a frame including a face corresponding to "blankness" and that including a face corresponding to "smile" may be automatically determined based on their relative values. Furthermore, conditions associated with the degree of opening of the eyes and mouth shape may be set in correspondence with facial expressions, it may be determined which of conditions a face of each input frame image satisfies, and a facial expression may be independently determined for each frame. With the arrangement that independently determines a facial expression for each frame, a facial expression can be determined even from a still image as a single frame. In this manner, a facial expression is determined by determining whether or not the shapes of parts such as the eyes and mouse which specify a face and are extracted from image data satisfy specific conditions, unlike in personal authentication which makes comparison with features registered in advance for each person.

As described above, in the personal authentication, the features detected from image data are compared with those registered in advance in the personal database unit 8 for each person to calculate their absolute value sum S. However, when the facial expression of a person changes, the coordinates of the features detected from the image data also change, and the value of the absolute value sum S calculated upon personal authentication largely varies depending on facial expressions, thus lowering the precision of the personal authentication. By contrast, the personal authentication apparatus of this embodiment can improve the precision since it executes personal authentication as follows.

Feature data for personal authentication are registered in advance in the personal database unit 8 in correspondence with persons whose personal authentication is to be executed, and their facial expressions, as shown in FIG. 2. At the time of registration, an object may sequentially create designated facial expressions, and feature data extracted from respective captured facial expressions may be registered. Alternatively, facial expressions may be automatically determined by the aforementioned method from image data including facial expressions arbitrarily changed by an object, and their features may be registered. Alternatively, the user may select an arbitrary face from already captured image data, and may register the features of that face as feature data of a person and facial expression designated by the user.

Figure 3:
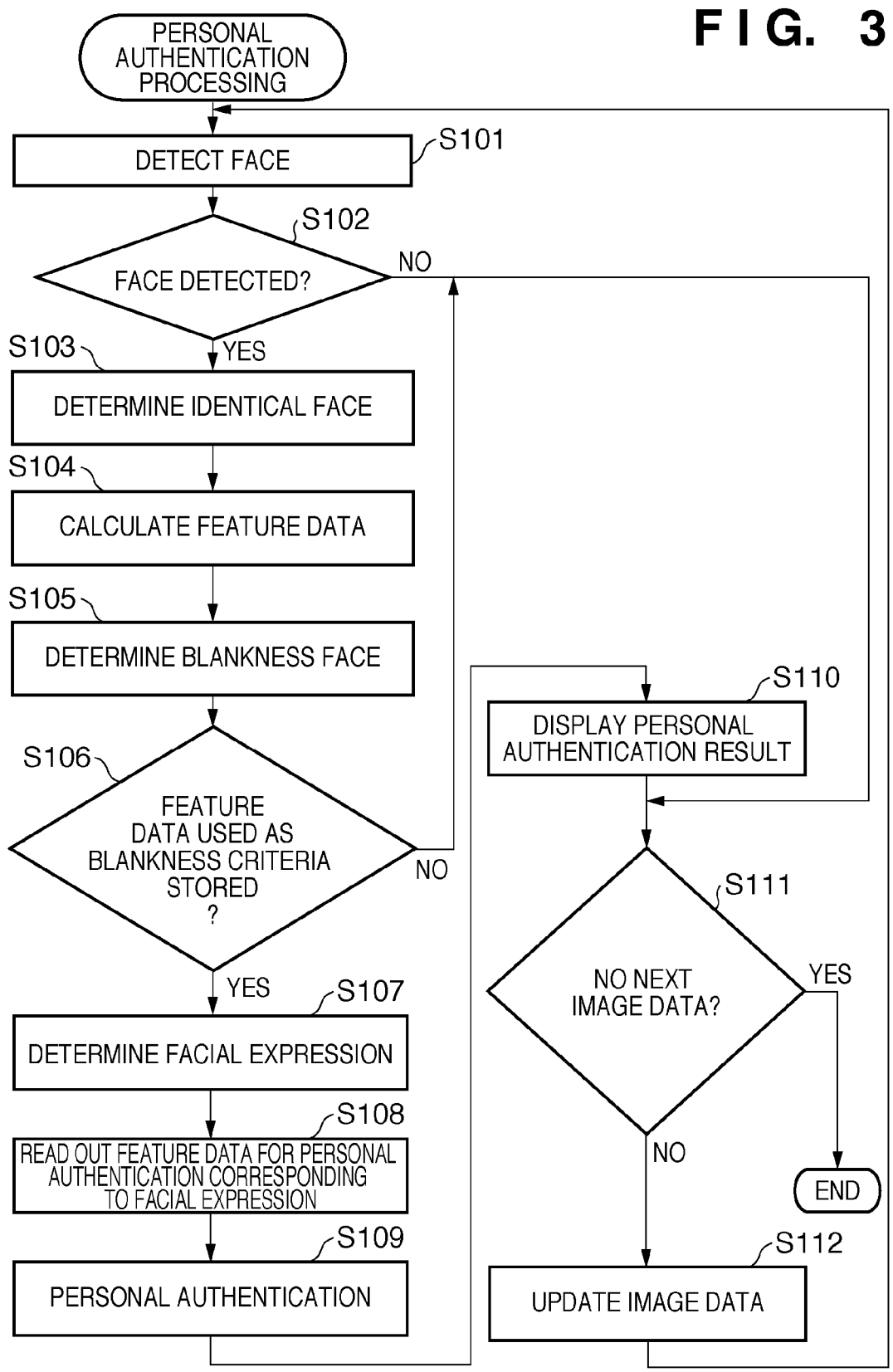
FIG. 3 is a flowchart showing personal authentication processing according to the first embodiment.

The operation at the time of personal authentication will be described below with reference to the flowchart of FIG. 3. This flowchart is started when image data is input to the image input unit 1. If the image input unit 1 includes a camera, this image data corresponds to that which is captured by that camera or is read out from a recording medium. If the image input unit 1 includes a personal computer, the image data corresponds to an image read out from a recording medium or image data received via a network. This image data may be either a still image or movie. If the image data is a movie, personal authentication is successively executed at frame intervals according to a time period required for the personal authentication. The following description of the embodiment will be given under the assumption that image data of a movie is input to the image input unit 1.

In step S101, the face detection unit 2 receives image data for one frame of the movie from the image input unit 1, and detects faces of persons.

If it is determined in step S102 that the face detection unit 2 can detect one or more faces, the process advances to step S103; otherwise, the process jumps to step S111. It is determined in step S111 if the image data input to the image input unit 1 includes image data of another frame. If the image data includes another frame, the image data is updated in step S112. Then, the process returns to step S101, and the face detection unit 2 executes face detection from the updated image data.

In step S103, the identical person determination unit 3 receives the detection results of faces detected by the face detection unit 2, and determines which of faces detected from different frames are considered as a face of an identical person. If image data includes a plurality of persons, their faces have to be distinguished from each other, and feature data used as the aforementioned "blankness" criteria have to be calculated for each face. For this purpose, the identical person determination unit 3 compares the central positions and sizes of respective faces detected from respective frames, and estimates a face having the smallest sum total of the distances of the central position of faces and size change amounts among successive frames as a face of an identical person. However, even when this sum total is smallest, if it falls outside a pre-set threshold range, the identical person determination unit 3 determines that there is no identical person. The identical person determination unit 3 may estimate an identical person by comparing either the positions or sizes of faces, or may estimate faces having highest similarities of their luminance values and color information as an identical person. In this manner, by checking correlation between faces detected from two frames, whether or not faces detected from these two frames are that of an identical person can be determined. If image data input to the image input unit 1 is a still image, this step S103 is omitted.

In step S104, the face detection unit 2 calculates feature data including coordinates of the features, as shown in FIGS. 6 and 7, from the faces that can be detected.

The facial expression determination unit 4 determines in step S105 using the feature data calculated by the face detection unit 2 and the determination result obtained by the identical person determination unit 3 if each face is a "blankness" face. In this embodiment, when the change amount of the shape of the mouse does not exceed a predetermined threshold during a predetermined period of time, the facial expression determination unit 4 determines that a face at that time is a "blankness" face, and determines a "smile" face and the like based on the feature data of this "blankness" face. More specifically, the facial expression determination unit 4 accumulates the feature data of faces determined as an identical person, and observes a relative change of the feature data, thereby determining whether or not that face is a "blankness" face. When the facial expression determination unit 4 can determine a "blankness" face, it calculates feature data used as "blankness" criteria from the "blankness" face. If the feature data are not sufficiently accumulated, and the facial expression determination unit 4 cannot calculate feature data used as "blankness" criteria (NO in step S106), the process returns to step S101 via steps S111 and S112 so as to accumulate face feature data. If the facial expression determination unit 4 can calculate feature data used as "blankness" criteria in step S105 (YES in step S106), the process advances to step S107. Note that the facial expression determination unit 4 may skip the process in step S105 for the face for which the feature data used as "blankness" criteria can be calculated until it loses sight of that face. Alternatively, even after the feature data used as "blankness" criteria are calculated, every time new feature data are calculated in step S104, the facial expression determination unit 4 may calculate new feature data used as "blankness" criteria, and may update the feature data.

In step S107, the facial expression determination unit 4 calculates a facial expression of each face indicated by latest feature data calculated in step S104 by comparing the latest feature data with those used as "blankness" criteria calculated in step S105.

In step S108, the database selection unit 5 selects and reads out, from the personal database unit 8, all feature data for personal authentication corresponding to the facial expression determination result output from the facial expression determination unit 4. For example, if the facial expression determination unit 4 determines a "smile" face in step S107, the database selection unit 5 selects and reads out feature data A-2, B-2, and C-2 of all persons in case of a "smile" face from those in the personal database unit 8 shown in FIG. 2. When feature data of a large number of persons are registered in advance, the database selection unit 5 may select only feature data of a specific person designated by the user or those included in a person group.

In step S109, the authentication unit 6 identifies who is a person with that face, based on the absolute value sum S of the latest feature data, the facial expression of which has been determined, and those for personal authentication corresponding to that facial expression.

In step S110, the result output unit 7 receives the personal authentication result from the authentication unit 6, and displays the received result by superimposing it on an image generated from image data to be authenticated. Of course, the display method of the authentication result is not limited to such specific display method, and various methods are available. When the personal authentication is executed at the same time for a plurality of faces, it is desirable to clarify the correspondence between the authentication results and faces.

If the image data input to the image input unit 1 still includes frame images which are to undergo face detection (NO in step S111), the process returns to step S101 via step S112; otherwise (YES in step S111), this flowchart ends.

According to the aforementioned embodiment, even when a facial expression changes, that facial expression is detected, and personal authentication is executed using feature data corresponding to the detected facial expression, thus allowing personal authentication with high precision.

Second Embodiment

As the second embodiment, a case will be explained wherein feature data corresponding to facial expressions detected in the first embodiment are not registered in the personal database unit 8. A personal authentication apparatus of this embodiment additionally registers, in the personal database unit 8, feature data of a facial expression different from that upon authentication using the personal authentication results of image data of other frames.

Figure 4:
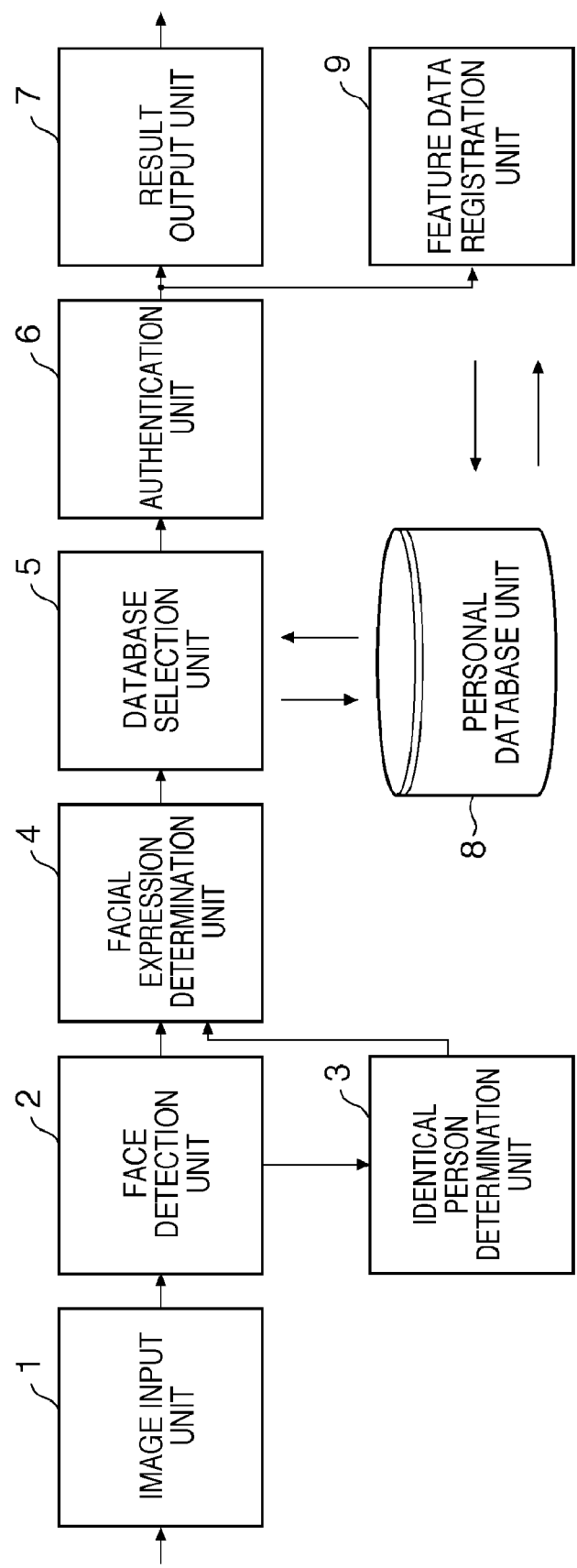
FIG. 4 is a block diagram showing the arrangement of a personal authentication apparatus according to the second embodiment.

FIG. 4 shows the arrangement of the personal authentication apparatus of the second embodiment, and a feature data registration unit 9 is added to the arrangement shown in FIG. 1. For example, assume that feature data for personal authentication corresponding to "blankness" and "eye closure" of a certain person are registered in the personal database unit 8, but feature data for personal authentication corresponding to "smile" are not registered. When it is determined that this person has a "smile" face, the feature data registration unit 9 registers feature data corresponding to the "smile" face of this person in the personal database unit 8 as those for personal authentication corresponding to "smile".

As for other arrangements, the same reference numerals in FIG. 4 denote the same parts as in FIG. 1, and a repetitive description thereof will be avoided.

Figure 5A:
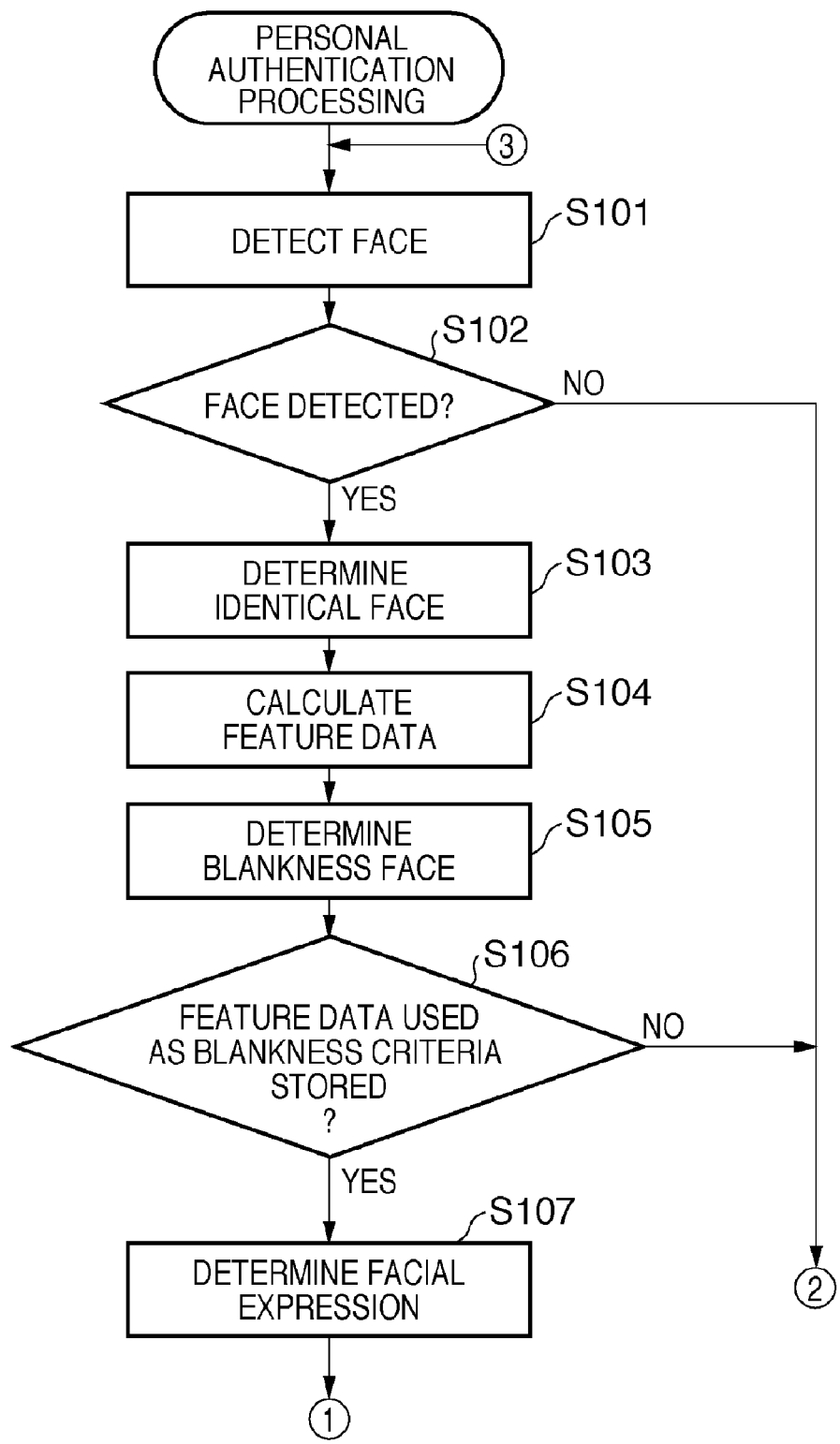
FIGS. 5A and 5B are a flowchart showing personal authentication processing according to the second embodiment.
Figure 5B:
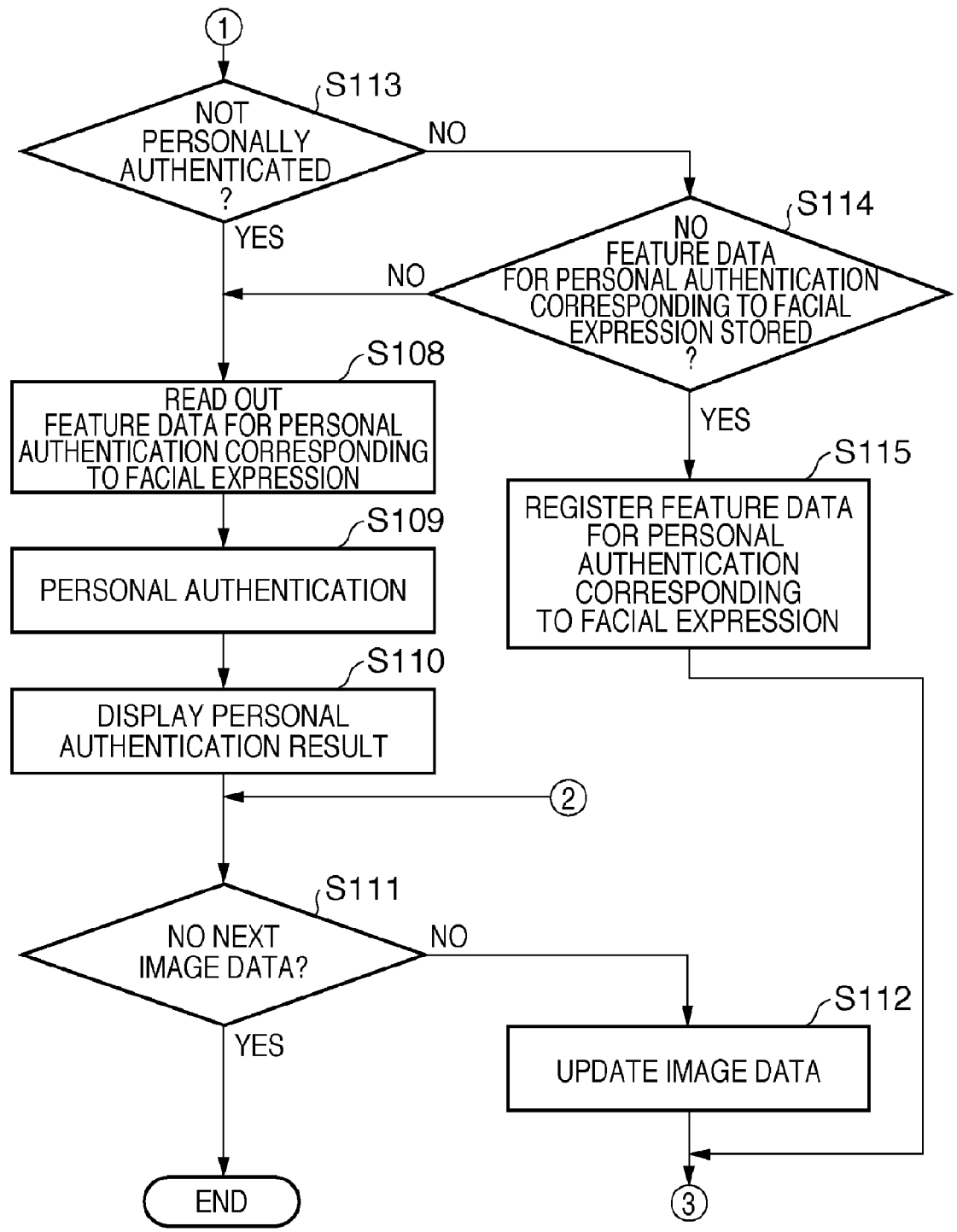

The operation of the personal authentication apparatus of this embodiment will be described below with reference to FIGS. 5A and 5B. The processes in steps S113 to S115 in FIG. 5B are different from FIG. 3 as the first embodiment. Since the processes denoted by the same step numbers as in FIG. 3 of those in FIG. 5A are the same as those in FIG. 3, a repetitive description thereof will be avoided.

In steps S101 to S107, the face detection unit 2 detects faces from respective frames and calculates feature data of these faces, and the identical person determination unit 3 determines which of faces of those detected from the respective frames correspond to identical persons. Then, the facial expression determination unit 4 determines a facial expression of a face for which feature data used as "blankness" criteria are calculated.

The feature data registration unit 9 checks in step S113 whether or not the face, whose facial expression is determined in step S107, is a face that has already been personally authenticated. Whether or not a face has already been personally authenticated can be determined based on the previous authentication results by the authentication unit 6 and the previous identical person determination results by the identical person determination unit 3. That is, whether or not the identical person determination unit 3 can successively track a face, which has already been personally authenticated based on an arbitrary facial expression in the previous frame, even after that personal authentication by the method described in step S103 of the first embodiment is determined. If the face whose facial expression is determined in step S107 is that which has not been personally authenticated yet (YES in step S113), the process advances to step S108 to execute the same processing as in the first embodiment.

If the face whose facial expression is determined in step S107 is that which has already been personally authenticated (NO in step S113), the process advances to step S114. The feature data registration unit 9 determines in step S114 whether or not feature data for personal authentication of that person, which correspond to the facial expression determined in step S107, have already been registered in the personal database unit 8.

If the feature data for personal authentication of that person, which correspond to the facial expression determined in step S107, have already been registered in the personal database unit 8 (NO in step S114), the process advances to step S108 to execute the same processing as in the first embodiment.

If the feature data for personal authentication of that person, which correspond to the facial expression determined in step S107, have not been registered yet in the personal database unit 8 (YES in step S114), the process advances to step S115.

In step S115, the feature data registration unit 9 registers feature data calculated from the face with that facial expression as those for personal authentication corresponding to that facial expression of the person in the personal database unit 8.

A practical example will be described below. Assume that feature data of "blankness" of Mr. B have already been registered in the personal database unit 8, but feature data of "smile" have not been registered yet. Also, assume that it has already been determined based on the authentication result using the feature data of "blankness" that a certain face is that of Mr. B. Furthermore, assume that the facial expression determination unit 4 determines a "smile" face for the face determined as Mr. B by the identical person determination unit 3 in image data of a new frame. At this time, the feature data registration unit 9 newly registers feature data of the face determined as a "smile" face in the personal database unit 8 as those for personal authentication of a "smile" face of Mr. B. Upon completion of registration, this personal authentication apparatus advances to step S112, and executes the same processing as in the first embodiment.

Note that feature data of respective facial expressions of an identical person are extracted and stored, and when that person is authenticated, feature data corresponding to a non-registered facial expression of the stored feature data may be registered as those for personal authentication.

If the database selection unit 5 determines in step S108 that accumulation of feature data for personal authentication corresponding to a specific facial expression is insufficient, the result output unit 7 may display a message that advises accordingly. When the result output unit 7 displays this message to the user, it can prompt the user to accumulate insufficient feature data for personal authentication corresponding to that facial expression.

In step S109, the authentication unit 6 may comprehensively authenticate a given face based on not only the personal authentication result for one facial expression but also those for a plurality of facial expressions. For example, the authentication unit 6 executes personal authentication using feature data of "smile" for a frame in which a facial expression is determined as "smile" in a movie, using those of "blankness" for a frame in which a facial expression is determined as "blankness", and those of "eye closure" for a frame in which a facial expression is determined as "eye closure". As a result, a person who is determined to have the highest degree of coincidence a large number of times may be selected. In this way, when authentication results of a plurality of face regions match, a final authentication result is obtained, thus improving the authentication precision. At the time of execution of personal authentication for an identical person in a movie, different authentication results may be obtained every time a facial expression changes. At this time, a "smile" face has larger variations of the degree of opening of the eyes and that of lift-up of the two ends of the mouse, and has a lower ratio of coincidence with feature data for personal authentication compared to a "blankness" face. For this reason, the authentication unit 6 may multiply the personal authentication result for a "smile" face by a weight smaller than that in the "blankness" state, and may take statistics of authentication results obtained time-serially, thus obtaining a final authentication result.

When different authentication results are obtained even for an identical person like that Mr. A is determined in case of "blankness", and Mr. B is determined in case of "eye closure", the feature data for personal authentication of "eye closure" may be updated using these results. In such case, the feature data registration unit 9 updates the feature data for personal authentication of "eye closure" of Mr. A in the personal database unit 8 using those of "eye closure" which are unwantedly determined as Mr. B.

According to the aforementioned embodiment, since feature data which are not registered in advance are automatically added, personal authentication with higher precision can be attained.

Other Embodiments

The present invention also includes a case in which the invention is achieved when a computer program that implements the functions of the aforementioned embodiments is directly or remotely supplied to a system or apparatus. In this case, a computer of the system or the like reads out and executes the computer program.

Therefore, the computer program itself installed in a computer to implement the functional processing of the present invention using the computer implements the present invention. In this case, the form of program is not particularly limited, and an object code, a program to be executed by an interpreter, script data to be supplied to an OS, and the like may be used as long as they have the program function.

As a recording medium (storage medium) for supplying the program, for example, a flexible disk, hard disk, optical disk, and magneto-optical disk may be used. In addition, an MO, CD-ROM, CD-R, CD-RW, magnetic tape, nonvolatile memory card, ROM, and DVD (DVD-ROM, DVD-R) may be used.

As another program supply method, the user can establish connection to a homepage on the Internet using a browser on a client computer, and can download the computer program itself of the present invention from the homepage. Also, the computer program can be supplied by downloading a compressed file containing an automatic installation function onto a recording medium such as a hard disk. Also, the computer program that forms the program of the present invention may be segmented into a plurality of files, which may be downloaded from different homepages. That is, the present invention includes a WWW server which makes a plurality of users download program files required to implement the functional processing of the present invention by computers.

Also, a storage medium such as a CD-ROM, which stores the encrypted program of the present invention, may be delivered to the user, and the user who has cleared a predetermined condition may be allowed to download key information that decrypts the program from a homepage via the Internet. In this case, the user executes the encrypted program using the downloaded key information and installs that program on a computer, thus implementing the present invention.

The functions of the aforementioned embodiments are implemented when the computer executes the readout program. In addition, an OS or the like running on the computer executes some or all of actual processes based on an instruction of that program, thus implementing the functions of the aforementioned embodiments.

Furthermore, the functions of the aforementioned embodiments are implemented when the program read out from the recording medium is written in a memory of a function expansion board or unit, which is inserted in or connected to the computer, and a CPU or the like on the board or the like executes some or all of actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-156996, filed Jun. 16, 2008, and No. 2009-105611, filed Apr. 23, 2009, which are hereby incorporated by reference herein in their entirety.

What is claimed is:

1. A personal authentication apparatus comprising:
an input unit configured to input image data;
a face detection unit configured to detect a face region of a person included in the image data input by said input unit, and to detect feature data from the detected face region;
a facial expression determination unit configured to determine a facial expression from the face region detected by said face detection unit;
a storage unit configured to store feature data used to authenticate a person in correspondence with respective facial expressions of a plurality of faces;
a selection unit configured to select feature data corresponding to the facial expression determined by said facial expression determination unit from said storage unit; and an authentication unit configured to authenticate a person by comparing the feature data of the face region detected by said face detection unit, and the feature data selected by said selection unit.

2. The apparatus according to claim 1, wherein said facial expression determination unit calculates a change amount of feature data from a plurality of successive image data, and determines a facial expression of a face based on the change amount.

3. The apparatus according to claim 1, wherein said authentication unit authenticates a person for each of a plurality of image data, which are used by said facial expression determination unit in determination of facial expressions of faces, and determines a final authentication result based on respective authentication results.

4. The apparatus according to claim 1, wherein when feature data which is not stored in said storage unit and corresponds to another facial expression of a person is detected from a face, based on which the person is authenticated by said authentication unit, the feature data is stored in said storage unit as feature data corresponding to the other facial expression of the person.

5. The apparatus according to claim 1, further comprising a unit configured to notify that feature data corresponding to a facial expression selected by said selection unit is not stored in said storage unit when the feature data is not stored in said storage unit.

6. A personal authentication method to be executed by a personal authentication apparatus which includes:
   an input unit configured to input image data;
   a face detection unit configured to detect a face region of a person included in the image data input by the input unit, and to detect feature data from the detected face region;
   a facial expression determination unit configured to determine a facial expression from the face region detected by the face detection unit; and
   a storage unit configured to store feature data used to authenticate a person in correspondence with respective facial expressions of a plurality of faces, the method comprising:
a selection step of selecting feature data corresponding to the facial expression determined by the facial expression determination unit from the storage unit; and
an authentication step of authenticating a person by comparing the feature data of the face region detected by the face detection unit, and the feature data selected in the selection step.

* * * * *